(12) United States Patent
Ha et al.

(10) Patent No.: US 11,988,834 B2
(45) Date of Patent: May 21, 2024

(54) OPTICAL DEVICE

(71) Applicant: Samsung Display Co., LTD., Yongin-si (KR)

(72) Inventors: Ju Hwa Ha, Seoul (KR); Jae Joong Kwon, Suwon-si (KR); Jeong Woo Park, Yongin-si (KR); Su Bin Jung, Incheon (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 127 days.

(21) Appl. No.: 16/821,920

(22) Filed: Mar. 17, 2020

(65) Prior Publication Data

US 2020/0301148 A1     Sep. 24, 2020

(30) Foreign Application Priority Data

Mar. 18, 2019   (KR) .......................... 10-2019-0030469

(51) Int. Cl.
*G02B 27/01*     (2006.01)
*G02B 5/10*      (2006.01)

(52) U.S. Cl.
CPC ........... *G02B 27/0172* (2013.01); *G02B 5/10* (2013.01); *G02B 2027/0178* (2013.01)

(58) Field of Classification Search
CPC .......... G02B 27/0101; G02B 2027/013; G02B 27/0172; G02B 5/10; G02B 2027/0178
USPC ...................................................... 359/631
See application file for complete search history.

(56) References Cited

U.S. PATENT DOCUMENTS

| 5,093,567 A * | 3/1992 | Staveley ................. A42B 3/042 250/221 |
| 9,395,544 B2 * | 7/2016 | Luttmann .......... G02B 27/0172 |
| 9,761,051 B2 | 9/2017 | Bromer |
| 9,841,496 B2 | 12/2017 | Hudman |
| 11,054,622 B1 * | 7/2021 | Gollier ............... G02B 27/0172 |
| 11,308,695 B2 * | 4/2022 | Lan ....................... G06T 19/006 |
| 2005/0018308 A1 * | 1/2005 | Cassarly ............ G02B 27/0081 359/630 |
| 2010/0149073 A1 | 6/2010 | Chaum et al. |
| 2013/0222896 A1 * | 8/2013 | Komatsu ............. G02B 27/0172 359/365 |
| 2015/0187141 A1 * | 7/2015 | Bromer .............. G02B 27/0172 345/633 |

(Continued)

FOREIGN PATENT DOCUMENTS

| KR | 10-1660519 | 9/2016 |
| KR | 10-1830364 | 2/2018 |

(Continued)

*Primary Examiner* — James C. Jones
*Assistant Examiner* — Henry Duong
(74) *Attorney, Agent, or Firm* — CANTOR COLBURN LLP

(57) ABSTRACT

An optical device includes: a lens including a first lens portion having a first curved surface with a first curvature and a second lens portion having a second curved surface corresponding to the first curved surface; a display device disposed on a first side surface of the lens; a convex lens disposed between the first side surface of the lens and the display device; and a reflector disposed on the first curved surface of the first lens portion of the lens, the reflector configured to reflect light of the display device refracted by the convex lens toward a user's eye.

17 Claims, 16 Drawing Sheets

(56) References Cited

U.S. PATENT DOCUMENTS

| | | | | |
|---|---|---|---|---|
| 2017/0235161 A1* | 8/2017 | Hilkes | ............... | G02C 5/124 |
| | | | | 351/204 |
| 2018/0252849 A1* | 9/2018 | Hoppe | ............... | G02B 27/0172 |
| 2019/0086668 A1 | 3/2019 | Ha | | |
| 2020/0026084 A1 | 1/2020 | Kwon et al. | | |
| 2020/0183169 A1* | 6/2020 | Peng | ............... | G02B 6/0055 |
| 2020/0400962 A1* | 12/2020 | Hirano | ............... | G02C 11/06 |
| 2021/0390783 A1* | 12/2021 | Shin | ............... | G02B 27/4205 |
| 2021/0409675 A1* | 12/2021 | Min | ............... | H04N 13/344 |

FOREIGN PATENT DOCUMENTS

| | | |
|---|---|---|
| KR | 10-2018-0126174 | 11/2018 |
| KR | 10-2020-0010695 | 1/2020 |

* cited by examiner

OPTICAL DEVICE

CROSS-REFERENCE TO RELATED APPLICATION

This application claims priority from and the benefit of Korean Patent Application No. 10-2019-0030469, filed on Mar. 18, 2019, which is hereby incorporated by reference for all purposes as if fully set forth herein.

BACKGROUND

Field

Exemplary embodiments of the present invention relate to an optical device.

Discussion of the Background

Augmented reality is a technique of superimposing a virtual image on a real image viewed by a user's eyes and displaying them as a single image. The virtual image may be an image in the form of text or graphics, and the real image may be information about an actual object observed in the field of view of a device.

An optical device may include a plurality of optical members for changing an optical path of a virtual image displayed on a display device to provide the virtual image to the user's eyes. In this case, the optical path from the display device to the user's eyes is long and complicated, and the size of the optical device may be increased due to the plurality of optical members.

Recently, the optical device is provided in the form of a pair of glasses so that the user can easily carry it, and it can be easily worn or taken off. When the size of the optical device increases, it is difficult to realize the optical device. By using a convex lens having a short focal length as an optical member, it is possible to reduce the optical path from the display device to the user's eyes. However, in this case, the image quality of the virtual image viewed by the user may be lowered due to the chromatic aberration of the convex lens having a short focal length.

The above information disclosed in this Background section is only for understanding of the background of the inventive concepts, and, therefore, it may contain information that does not constitute prior art.

SUMMARY

Embodiments of the present disclosure provide an optical device capable of preventing or reducing a decrease in image quality of a virtual image viewed by a user due to chromatic aberration of a convex lens having a short focal length.

Additional features of the inventive concepts will be set forth in the description which follows, and in part will be apparent from the description, or may be learned by practice of is the inventive concepts.

According to one or more exemplary embodiments of the invention, an optical device includes: a lens including a first lens portion having a first curved surface with a first curvature and a second lens portion having a second curved surface corresponding to the first curved surface; a display device disposed on a first side surface of the lens; a convex lens disposed between the first side surface of the lens and the display device; and a reflector disposed on the first curved surface of the first lens portion of the lens, the reflector configured to reflect light of the display device refracted by the convex lens toward a user's eye.

The lens may include an adhesive disposed between the first lens portion and the second lens portion, the adhesive adhering the first curved surface of the first lens portion to the second curved surface of the second lens portion.

The first curved surface of the first lens portion may be concave away from the second lens portion, and the second curved surface of the second lens portion may be convex toward the first curved surface of the first lens portion.

The first curvature may be less than or equal to 0.01 $mm^{-1}$.

The reflector may include a reflecting surface having a concave curved surface.

A first lens surface of the convex lens facing the display device may be convex toward the display device, and a second lens surface of the convex lens facing the lens may be flat.

A first lens surface of the convex lens facing the display device may be flat, and a second lens surface of the convex lens facing the lens may be convex.

A first lens surface of the convex lens facing the display device may be convex toward the display device, and a second lens surface of the convex lens facing the lens may be convex toward the lens.

The optical device may further include: a first spacer disposed between the display device and the convex lens; and a second spacer disposed between the convex lens and the lens.

According to one or more exemplary embodiments of the invention, an optical device includes: a lens including a first lens portion having a first curved surface with a first curvature and a second lens portion having a second curved surface corresponding to the first curved surface; and a first reflector and a second reflector disposed on the first curved surface of the lens, the first reflector and the second reflector configured to reflect light of the display device refracted by the convex lens toward a user's eye, wherein the first reflector and the second reflector comprise reflecting surfaces having a concave curved surface.

A curvature of the reflecting surface of the first reflector may be equal to a curvature of the reflecting surface of the second reflector.

The first reflector and the second reflector may be arranged in parallel in a width direction of the lens.

The first reflector and the second reflector may not be arranged in parallel in a height direction of the lens.

The optical device may further include: a display device disposed on a first side surface of the lens; and a convex lens disposed between the first side surface of the lens and the display device.

The first curved surface of the first lens portion may be concave away from the second lens portion, and the second curved surface of the second lens portion may be convex toward the first curved surface of the first lens portion.

The first curvature is less than or equal to 0.01 $mm^{-1}$.

The optical device may further include: a first spacer disposed between the display device and the convex lens; and a second spacer disposed between the convex lens and the lens.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EXEMPLARY EMBODIMENTS

Figure 1:
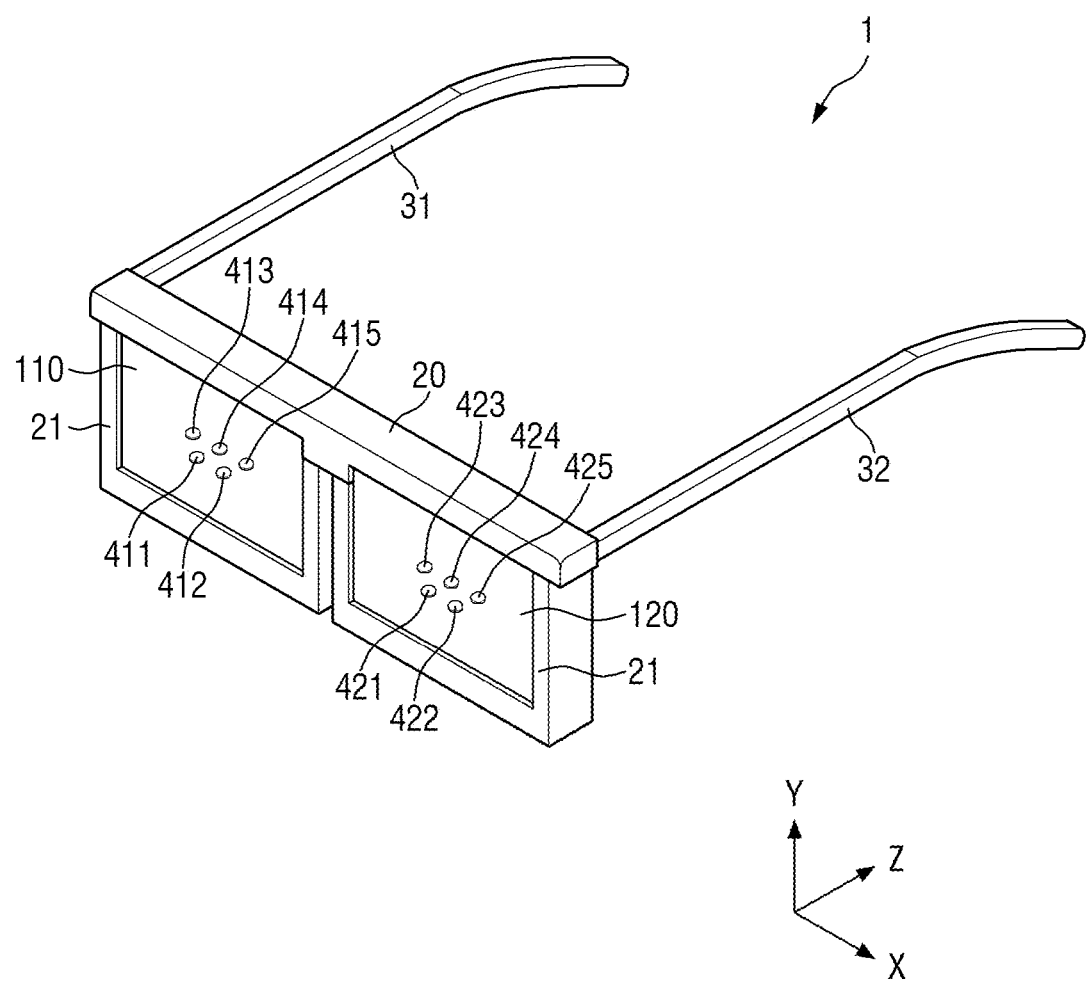
FIG. 1 is a perspective view showing an optical device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
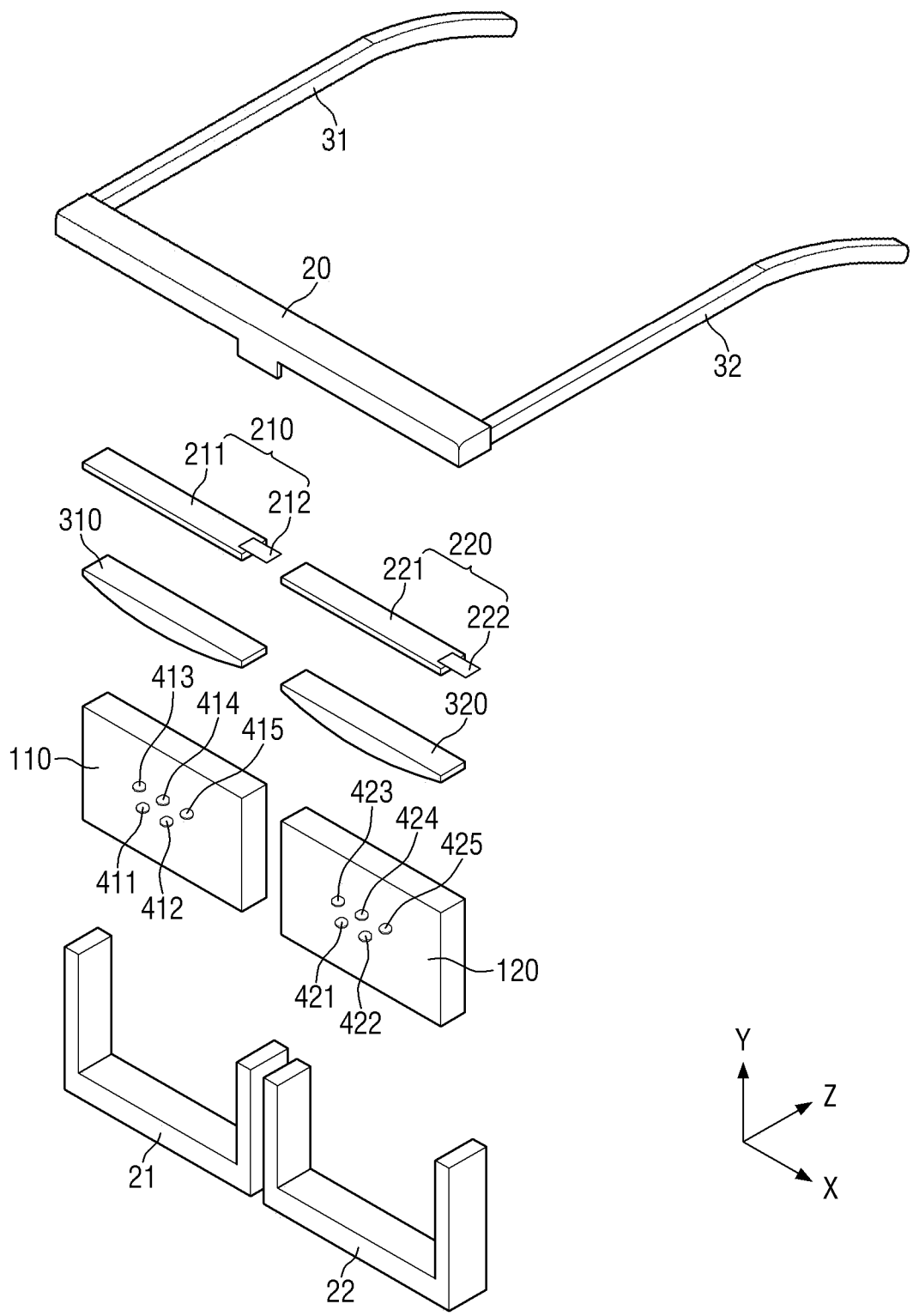
FIG. 2 is an exploded perspective view showing an optical device according to an exemplary embodiment.

FIG. 1 is a perspective view showing an optical device according to an exemplary embodiment. FIG. 2 is an exploded perspective view showing an optical device according to an exemplary embodiment.

Referring to FIGS. 1 and 2, an optical device 1 according to an exemplary embodiment includes a support frame 20, a first lens frame 21, a second lens frame 22, a first frame leg 31, a second frame leg 32, a first lens 110, a second lens 120, a first display device 210, a second display device 220, a first convex lens 310, a second convex lens 320, first to fifth reflectors 411, 412, 413, 414, and 415, and sixth to tenth reflectors 421, 422, 423, 424, and 425.

The terms "above," "top" and "upper surface" as used herein refer to a Z-axis direction, and the terms "below," "bottom", "lower surface" as used herein refers to a direction opposite to the Z-axis direction. Further, the term "left" as used herein refers to a direction opposite to an X-axis direction, the term "right" as used herein refers to the X-axis direction, the term "upper" as used herein refers to a Y-axis direction, and the term "lower" as used herein refers to a direction opposite to the Y-axis direction.

The support frame 20 serves to support the first lens 110 and the second lens 120 in cooperation with the first lens frame 21 and the second lens frame 22. The first lens 110 may be surrounded by the support frame 20 and the first lens frame 21. The second lens 120 may be surrounded by the support frame 20 and the second lens frame 22.

The support frame 20 may be disposed on the upper side surface of the first lens 110 and the upper side surface of the second lens 120. The support frame 20 may be elongated in a width direction (X-axis direction) of the first lens 110.

The first lens frame 21 may be disposed on the left side surface, the lower side surface and the right side surface of the first lens 110. The first lens frame 21 may be coupled to the support frame 20. The second lens frame 22 may be disposed on the left side surface, the lower side surface, and the right side surface of the second lens 120. The second lens frame 22 may be coupled to the support frame 20. Each of the first lens frame 21 and the second lens frame 22 may include a nose pad.

Although it is illustrated in FIG. 2 that the support frame 20, the first lens frame 21 and the second lens frame 22 are separately formed and coupled, the present disclosure is not limited thereto. The support frame 20, the first lens frame 21 and the second lens frame 22 may be formed integrally with each other.

The first frame leg 31 may be fixed to the left end of the lower side surface of the support frame 20. The second frame leg 32 may be fixed to the right end of the lower side surface of the support frame 20. Each of the first frame leg 31 and the second frame leg 32 may be fixed to the support frame 20 by a fixing member such as a screw.

Each of the support frame 20, the first lens frame 21, the second lens frame 22, the first frame leg 31 and the second frame leg 32 may include plastic, metal, or both plastic and metal. The first lens frame 21 and the second lens frame 22 may be omitted.

Each of the first lens 110 and the second lens 120 may be formed of glass or plastic in a transparent or translucent manner. Thus, the user can view a real image through the first lens 110 and the second lens 120. The first lens 110 and the second lens 120 may have a refractive power in consideration of the visual acuity of the user.

Each of the first lens 110 and the second lens 120 may be formed as a hexahedron having an upper surface, a lower surface and first to fourth side surfaces which are quadrangular. The upper surface of the first lens 110 is a surface facing a right eye RE of the user, and may be an exit surface from which the light of the first display device 210 is emitted by the first to fourth reflectors 411, 412, 413, and 414. The lower surface of the first lens 110 may be an outer surface of the first lens 110. The upper surface of the second lens 120 is a surface facing a left eye LE of the user, and may be an exit surface from which the light of the second display device 220 is emitted by the fifth to eighth reflectors 421, 422, 423, and 424. The lower surface of the second lens 120 may be an outer surface of the second lens 120.

Each of the first lens 110 and the second lens 120 is not limited to that shown in FIGS. 1 and 2, and may be formed as a polyhedron having a first surface, a second surface and side surfaces, which are polygonal. In addition to the polyhedron, each of the first lens 110 and the second lens 120 may be formed in other shapes such as a cylinder, an elliptic cylinder, a semicircular cylinder, a semi-elliptic cylinder, a distorted cylinder, or a distorted semicircular cylinder. The distorted cylinder and semicircular cylinder refer to a cylinder and a semicircular cylinder having a non-constant diameter.

The first to fifth reflectors 411, 412, 413, 414, and 415 are disposed in the first lens 110. The sixth to tenth reflectors 421, 422, 423, 424, and 425 are disposed in the second lens 120. Each of the first to fifth reflectors 411, 412, 413, 414, and 415 and the sixth to tenth reflectors 421, 422, 423, 424, and 425 may be a small mirror such as a pin mirror. Although FIGS. 1 and 2 illustrate that each of the first to fifth reflectors 411, 412, 413, 414, and 415 and the sixth to tenth reflectors 421, 422, 423, 424, and 425 has a circular cross section in a plan view, it may have an elliptical or polygonal cross section in addition to the circular shape.

The first to fifth reflectors 411, 412, 413, 414, and 415 may reflect an image displayed on the first display device 210 and provide the reflected image to the user's right eye RE. The sixth to tenth reflectors 421, 422, 423, 424, and 425 may reflect an image displayed on the second display device 220 and provide the reflected image to the user's left eye LE.

Each of the first to fifth reflectors 411, 412, 413, 414, and 415 and the sixth to tenth reflectors 421, 422, 423, 424, and 425 may be formed to be smaller in size than the pupil of the right eye RE or left eye LE. For example, each of the first to fifth reflectors 411, 412, 413, 414, and 415 and the sixth to tenth reflectors 421, 422, 423, 424, and 425 may be formed to have a diameter of 500 μm to 4 mm. In this case, since the user focuses on the real image, it is difficult to recognize the first to fifth reflectors 411, 412, 413, 414, and 415 and the sixth to tenth reflectors 421, 422, 423, 424, and 425. However, as the size of each of the first to fifth reflectors 411, 412, 413, 414, and 415 and the sixth to tenth reflectors 421, 422, 423, 424, and 425 decreases, the luminance of the image of the first display device 210 provided to the user's right eye RE and the luminance of the image of the second display device 220 provided to the user's left eye LE may decrease. Thus, the size of each of the first to fifth reflectors 411, 412, 413, 414, and 415 and the sixth to tenth reflectors 421, 422, 423, 424, and 425 may be set in consideration of whether the user can recognize the mirror and the luminance of the image provided to the user.

Each of the first to fifth reflectors 411, 412, 413, 414, and 415 and the sixth to tenth reflectors 421, 422, 423, 424, and 425 may have a cylindrical shape as shown in FIGS. 1 and 2. In this case, each of the first to fifth reflectors 411, 412, 413, 414, and 415 and the sixth to tenth reflectors 421, 422, 423, 424, and 425 may include two bottom surfaces, and one of the two bottom surfaces facing the first display device 210 or the second display device 220 may be defined as a reflecting surface.

The reflecting surface of each of the first to fifth reflectors 411, 412, 413, 414, and 415 and the sixth to tenth reflectors 421, 422, 423, 424, and 425 may be formed as a concave curved surface having a curvature. In this case, the image of the first display device 210 reflected by the first to fifth reflectors 411, 412, 413, 414, and 415 may have a predetermined focal length. Further, the image of the second display device 220 reflected by the sixth to tenth reflectors 421, 422, 423, 424, and 425 may have a predetermined focal length.

Although FIGS. 1 and 2 illustrate that five reflectors 411, 412, 413, 414, and 415 are disposed in the first lens 110 and five reflectors 421, 422, 423, 424, and 425 are disposed in the second lens 120, the number of reflectors disposed in the first lens 110 and the number of reflectors disposed in the second lens 120 are not limited thereto. More than five reflectors may be disposed in each of the first lens 110 and the second lens 120.

Each of the first display device 210 and the second display device 220 displays a virtual image for realizing an augmented reality. The first display device 210 may include a first display panel 211, a first circuit board 212 having a first driving circuit. The second display device 220 may include a second display panel 221, a second circuit board 222 having a second driving circuit.

The first display panel 211 may be disposed on a first side surface of the first lens 110 and the second display panel 221 may be disposed on a first side surface of the second lens 120. For example, the first display panel 211 may be disposed on the upper side surface of the first lens 110, and the second display panel 221 may be disposed on the upper side surface of the second lens 120. In this case, the first display panel 211 and the second display panel 221 can be covered by the support frame 20. The arrangement position of the first display panel 211 and the arrangement position of the second display panel 221 are not limited to those shown in FIGS. 1 and 2.

Figure 16:
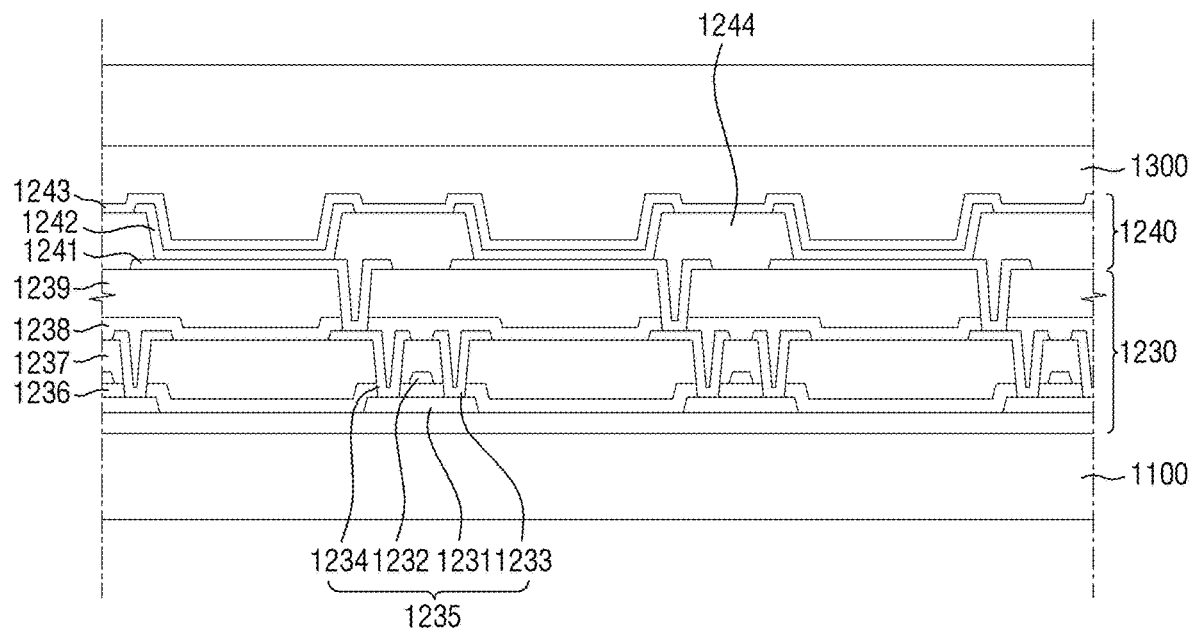
FIG. 16 is a cross-sectional view specifically showing a display area of the first display panel of FIG. 14.

Each of the first display panel 211 and the second display panel 221 may be a flexible display panel with flexibility, which can be bent. For example, each of the first display panel 211 and the second display panel 221 may be an organic light emitting display panel or an organic light emitting display panel including quantum dots. In this specification, a case where each of the first display panel 211 and the second display panel 221 is formed as an organic light emitting display panel as shown in FIG. 16 will be described mainly.

The first circuit board 212 may be attached to one end and the other end of the first display panel 211. The second circuit board 222 may be attached to one end of the second display panel 221. The first circuit board 212 and the second circuit board 222 may be flexible printed circuit boards, which can be bent.

A power supply unit for supplying power to the first display device 210 and the second display device 220 may be embedded in any one of the first frame leg 31 and the second frame leg 32. In this case, a first cable for connecting the first circuit board 212 to the power supply unit and a second cable for connecting the second circuit board 222 to the power supply unit may be additionally disposed. When the power source unit is embedded in the second frame leg 32, the first cable may be extended to the second frame leg 32. The length of the first cable may be longer than the length of the second cable.

The first convex lens 310 may be disposed between the first side surface of the first lens 110 and the first display device 210, and the second convex lens 320 may be disposed between the first side surface of the second lens 120 and the second display device 220.

Figure 18:
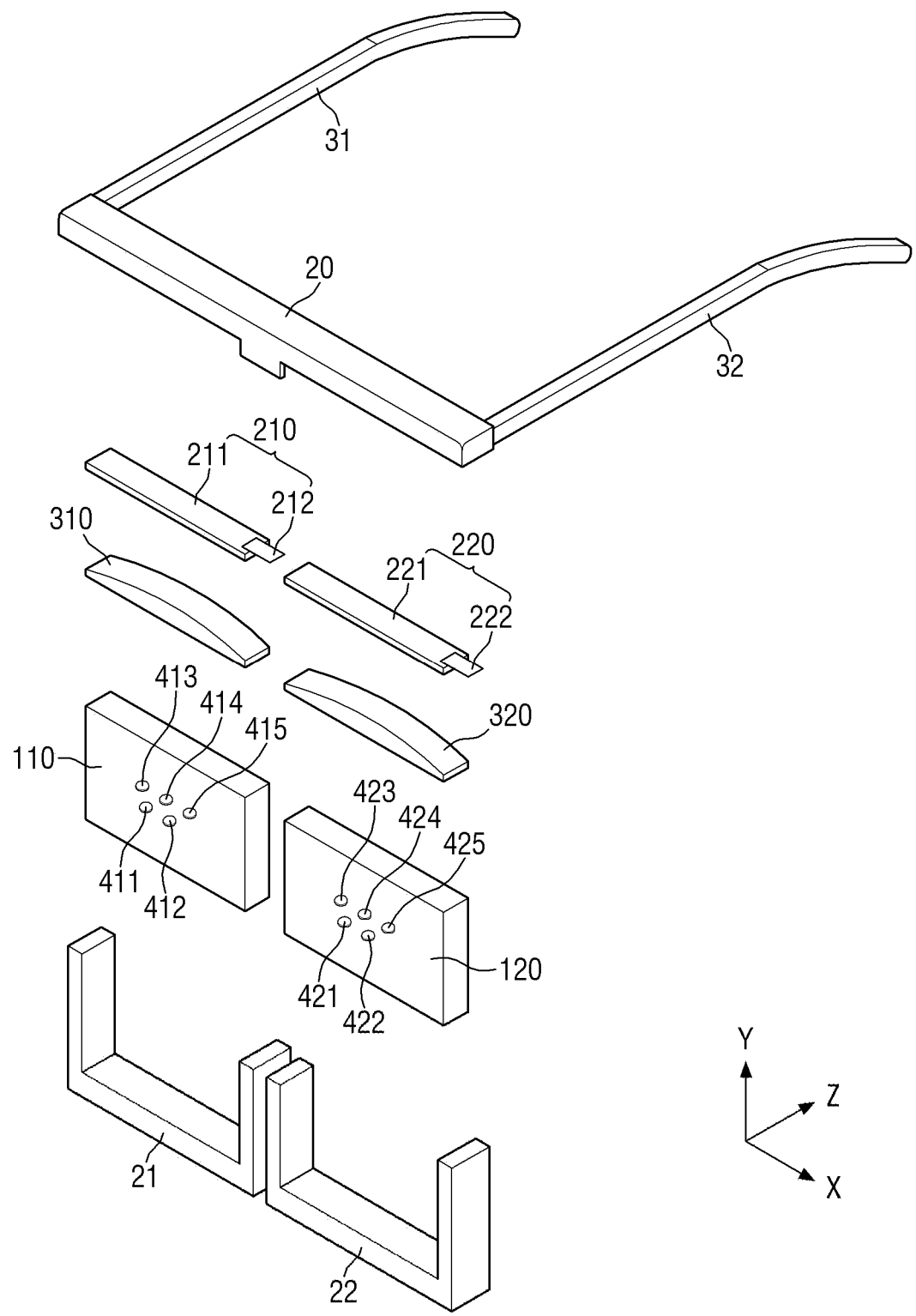
FIG. 18 is an exploded perspective view showing an optical device according to another exemplary embodiment.

Each of the first convex lens 310 and the second convex lens 320 may be formed as a flat convex lens. For example, as shown in FIG. 2, each of the first convex lens 310 and the second convex lens 320 may be formed such that one surface facing the first display device 210 is flat and the other surface facing the first side surface of the first lens 110 is convex. Alternatively, as shown in FIG. 18, each of the first convex lens 310 and the second convex lens 320 may be formed such that one surface facing the first display device 210 is convex and the other surface facing the first side surface of the first lens 110 is flat.

Figure 17:
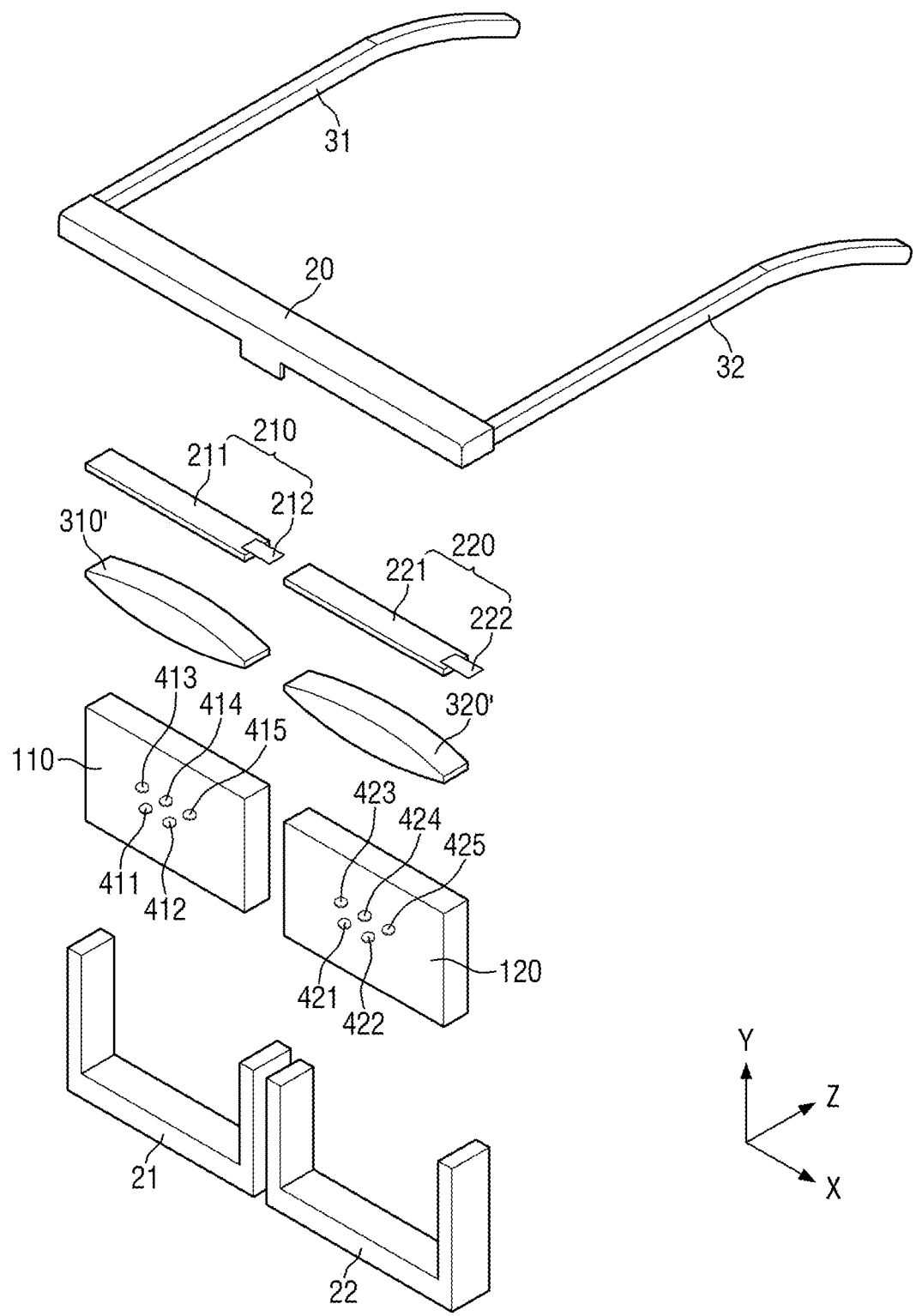
FIG. 17 is an exploded perspective view showing an optical device according to an exemplary embodiment.

Alternatively, each of the first convex lens 310 and the second convex lens 320 may be formed as a biconvex lens. For example, as shown in FIG. 17, each of the first convex lens 310 and the second convex lens 320 may be formed such that both of one surface facing the first display device 210 or the second display device 220 and the other surface facing the first side surface of the first lens 110 are convex.

The reflecting surface of each of the first to fifth reflectors 411, 412, 413, 414, and 415 and the sixth to tenth reflectors 421, 422, 423, 424, and 425 may be formed as a concave curved surface having a curvature. The distance at which the image of the first display device 210 is viewed may be determined by the focal length of the first convex lens 310 and the focal length of each of the first to fifth reflectors 411, 412, 413, 414, and 415. The focal length of each of the first to fifth reflectors 411, 412, 413, 414, and 415 may be determined depending on the curvature of the reflecting surface of each of the first to fifth reflectors 411, 412, 413, 414, and 415. In addition, the curvature of the reflecting surface of each of the first to fifth reflectors 411, 412, 413, 414, and 415 may be determined by the curvature of a first curved surface CS1. The distance at which the image of the second display device 220 is viewed may be determined by the focal length of the second convex lens 320 and the focal length of each of the sixth to tenth reflectors 421, 422, 423, 424, and 425. The focal length of each of the sixth to tenth reflectors 421, 422, 423, 424, and 425 may be determined depending on the curvature of the reflecting surface of each of the sixth to tenth reflectors 421, 422, 423, 424, and 425. In addition, the curvature of the reflecting surface of each of the sixth to tenth reflectors 421, 422, 423, 424, and 425 may be determined by the curvature of the first curved surface CS1.

Even if the focal length of the first convex lens 310 is not reduced, the distance at which the image of the first display device 210 is viewed may be shortened by the focal length of each of the first to fifth reflectors 411, 412, 413, 414, and 415. Further, even if the focal length of the second convex lens 320 is not reduced, the distance at which the image of the second display device 220 is viewed may be shortened by the focal length of each of the sixth to tenth reflectors 421, 422, 423, 424, and 425. Therefore, even if the focal length of each of the first convex lens 310 and the second convex lens 320 is not reduced, an optical path from the display device to the user's eyes can be reduced, thereby reducing the size of the optical device. Also, it is possible to prevent or suppress deterioration in the image quality of the virtual image viewed by the user due to the chromatic aberration of the first convex lens 310 and the second convex lens 320 having short focal lengths.

A polarizing film may be disposed between the first side surface of the first lens 110 and the first convex lens 310 and between each side surface of the second lens 120 and the second convex lens 320. The polarizing film may include a phase retardation film such as a linear polarizer plate and a quarter-wave (λ/4) plate. In this case, the linear polarizer plate may be disposed on the first side surface of the first lens 110 or the first side surface of the second lens 120, and the phase retardation film may be disposed between the linear polarizer plate and the first convex lens 310 or the second convex lens 320. Accordingly, the polarizing film can prevent or suppress light incident on the first display device 210 from the first side surface of the first lens 110 from being reflected by the first display device 210 and emitted to the first side surface of the first lens 110, while providing the light of the first display device 210 to the first side surface of the first lens 110. Also, the polarizing film can prevent or suppress light incident on the second display device 220 from the first side surface of the second lens 120 from being reflected by the second display device 220 and emitted to the first side surface of the second lens 120, while providing the light of the second display device 220 to the first side surface of the second lens 120.

Figure 3:
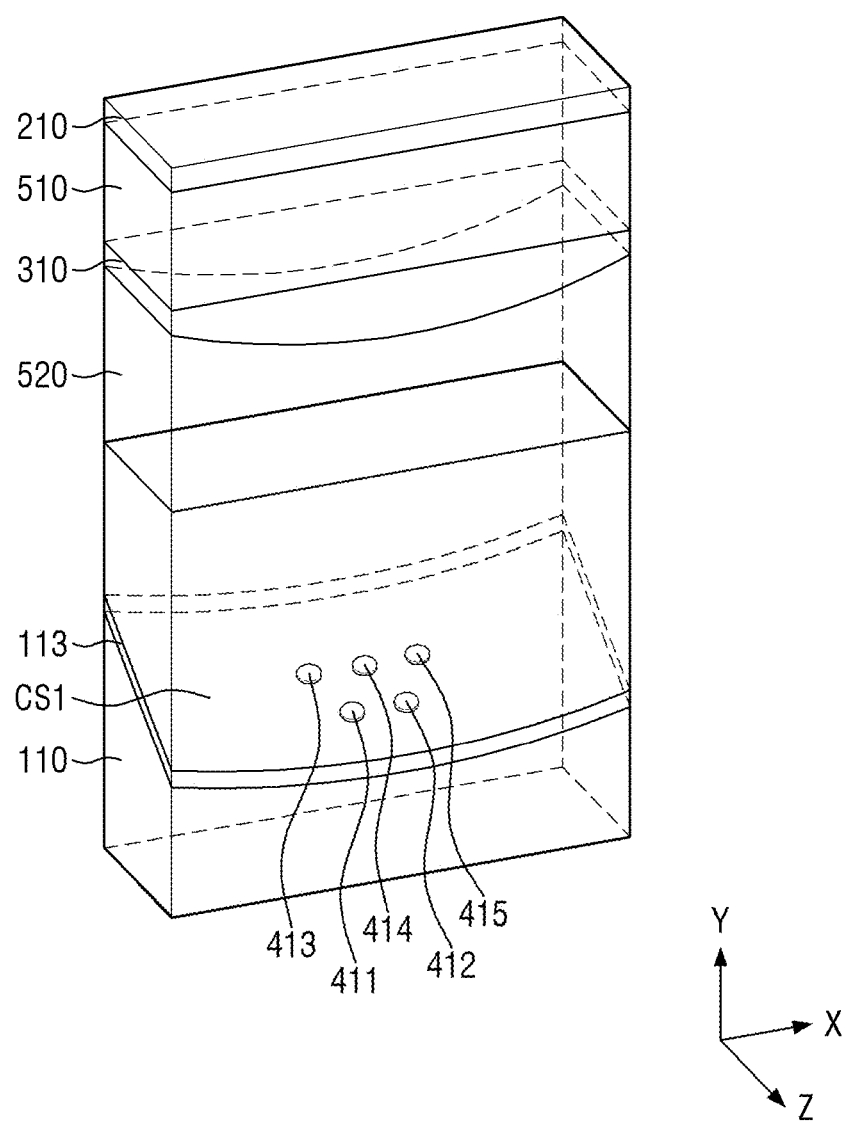
FIG. 3 is a perspective view showing an example of a first lens, a first convex lens and a first display device of FIG. 2.
Figure 4:
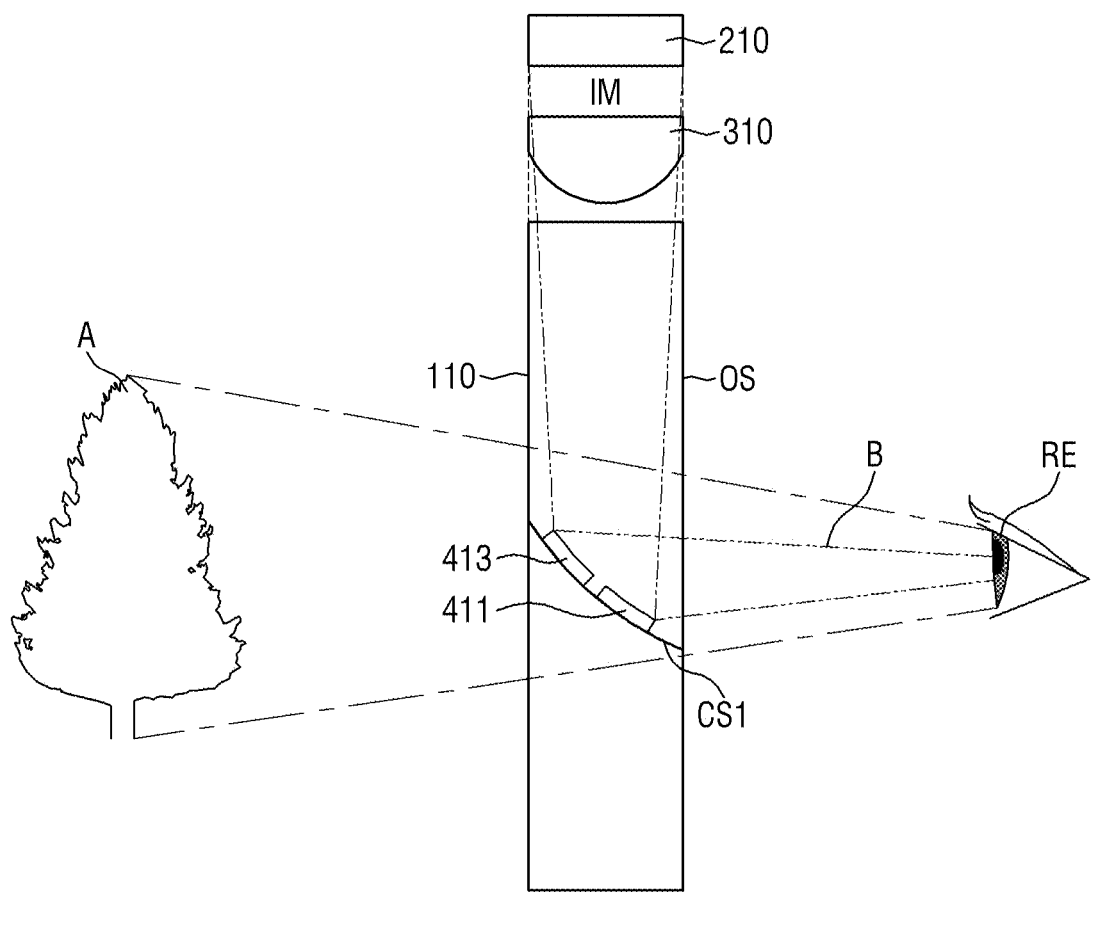
FIG. 4 is an exemplary diagram illustrating an augmented reality realizing method of an optical device according to an exemplary embodiment.
Figure 5:
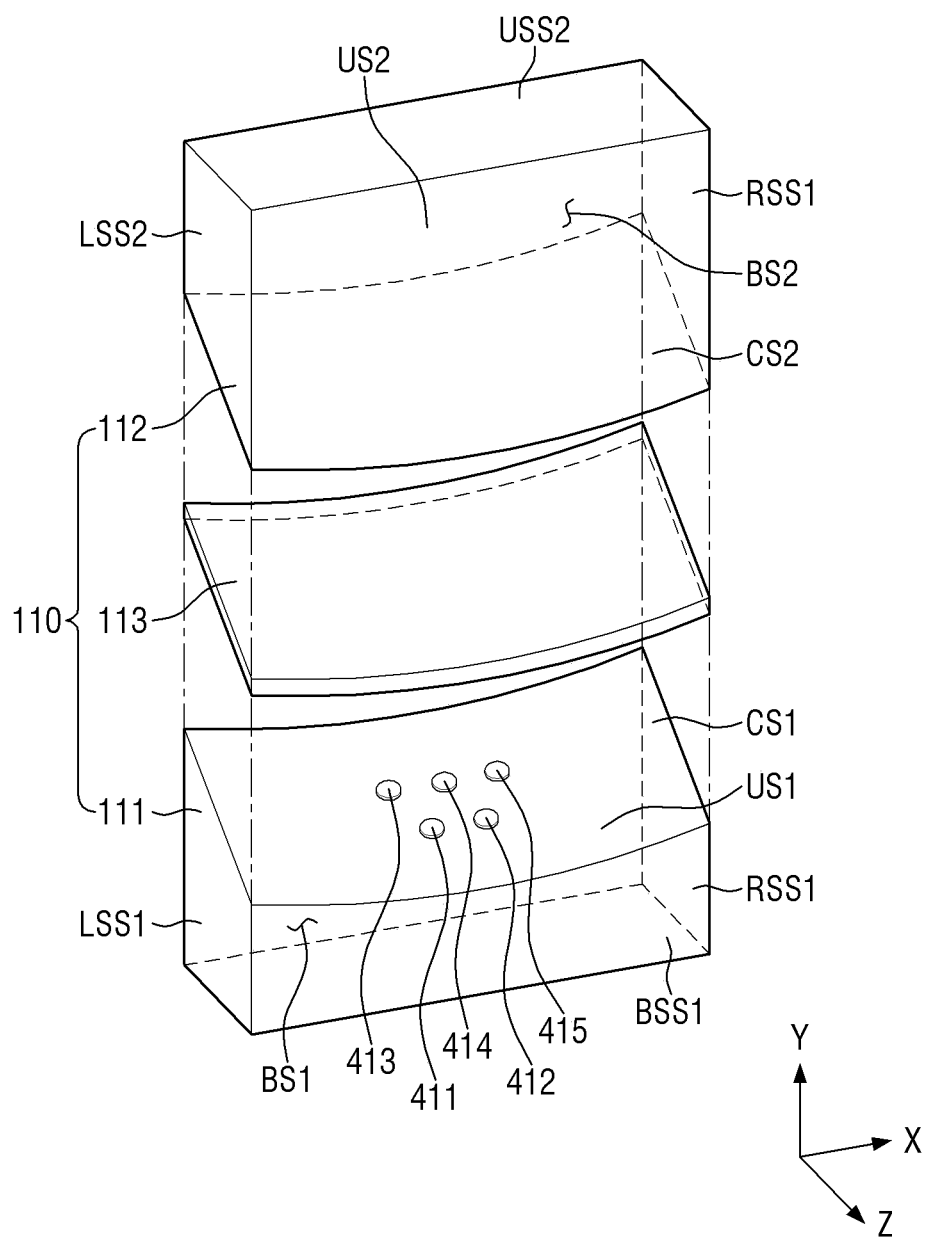
FIG. 5 is an exploded perspective view showing an example of the first lens and the reflectors of FIG. 3.
Figure 6:
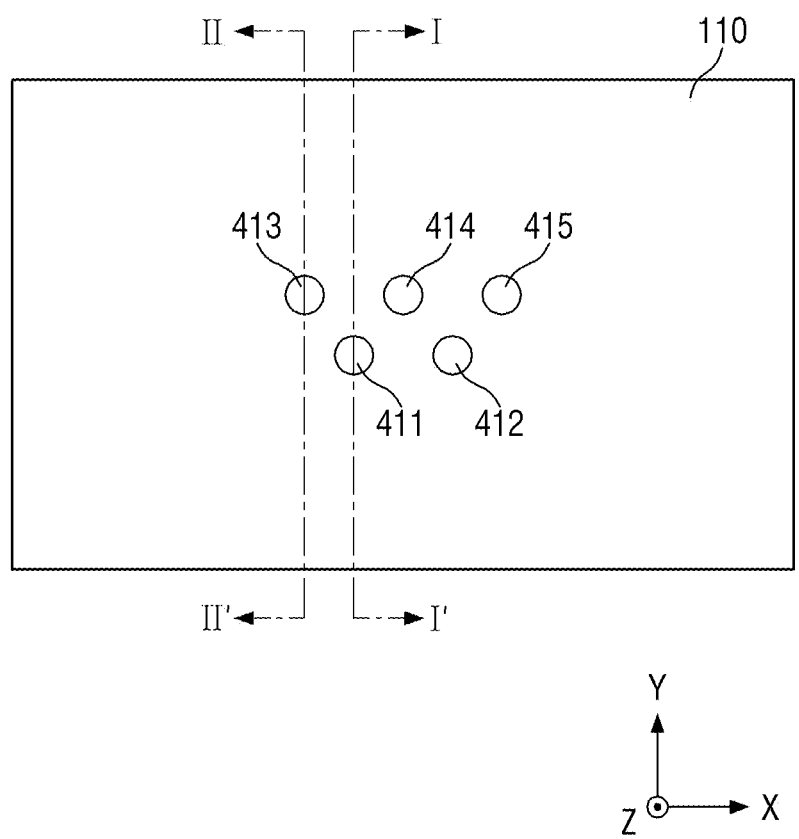
FIG. 6 is a plan view showing an example of the first lens of FIG. 3.
Figure 7:
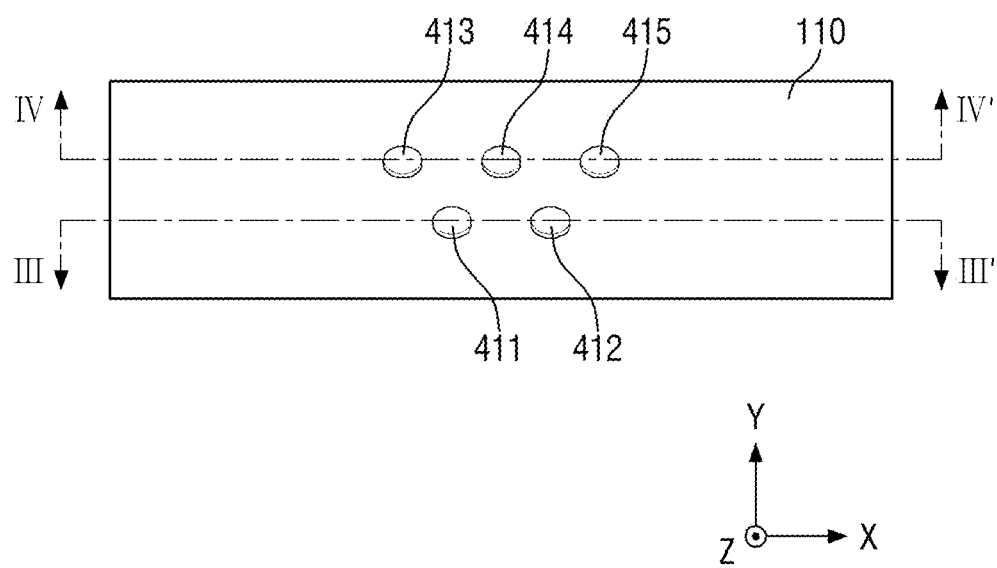
FIG. 7 is a front view showing an example of the first lens of FIG. 3.
Figure 8:
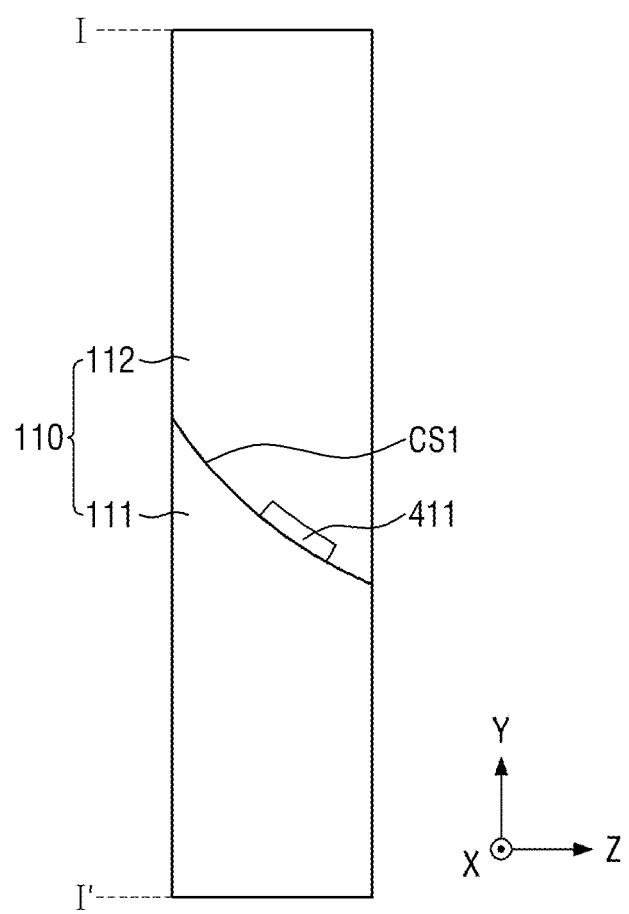
FIG. 8 is a side view showing an example taken along a sectional line I-I' of FIG. 6.
Figure 9:
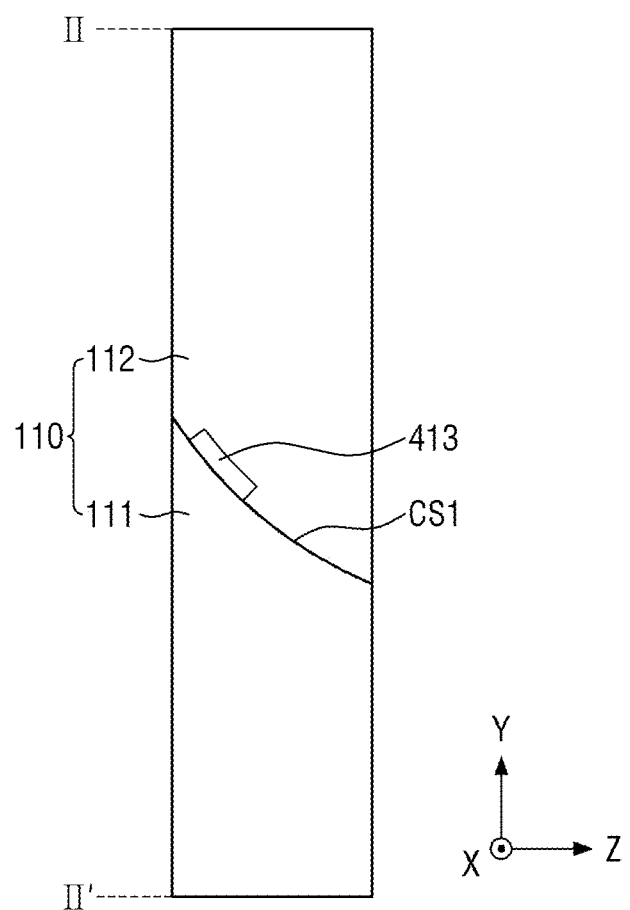
FIG. 9 is a side view showing an example taken along a sectional line II-II' of FIG. 6.
Figure 10:
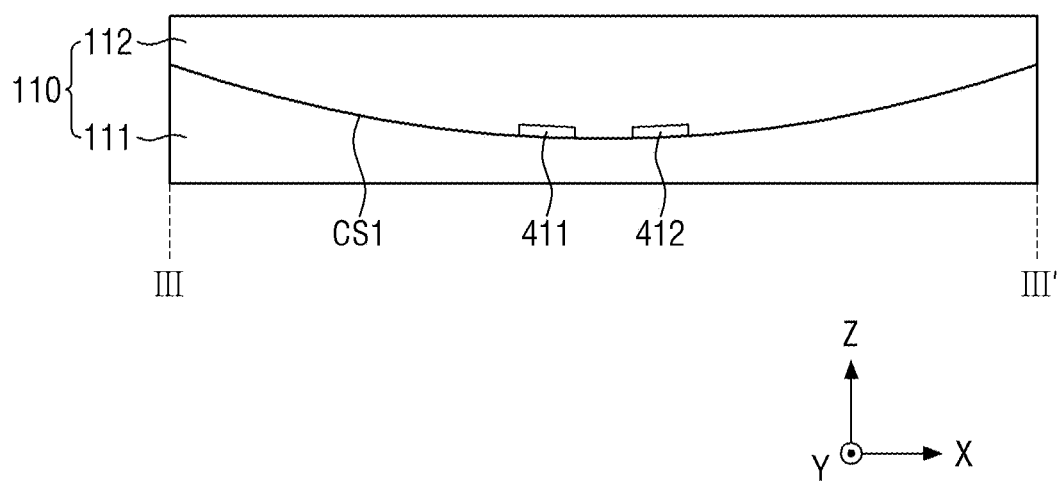
FIG. 10 is a side view showing an example taken along a sectional line III-III' of FIG. 7.
Figure 11:
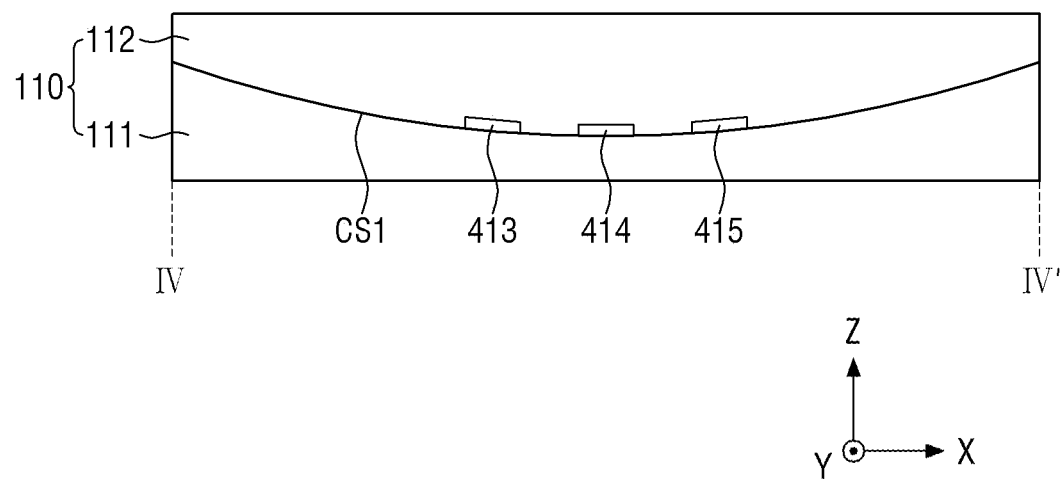
FIG. 11 is a side view showing an example taken along a sectional line IV-IV' of FIG. 7.

FIG. 3 is a perspective view showing an example of the first lens, the first convex lens and the first display device of FIG. 2. FIG. 4 is an exemplary diagram illustrating an augmented reality realizing method of an optical device according to an exemplary embodiment. FIG. 5 is an exploded perspective view showing an example of the first lens and the reflectors of FIG. 3. FIG. 6 is a plan view showing an example of the first lens of FIG. 3. FIG. 7 is a front view showing an example of the first lens of FIG. 3. FIG. 8 is a side view showing an example taken along a sectional line I-I' of FIG. 6. FIG. 9 is a side view showing an example taken along a sectional line II-II' of FIG. 6. FIG. 10 is a side view showing an example taken along a sectional line III-III' of FIG. 7. FIG. 11 is a side view showing an example taken along a sectional line IV-IV' of FIG. 7.

FIG. 4 shows the first lens 110, the first display device 210 and the first convex lens 310 as viewed from the left side of FIG. 3. Accordingly, among the first to fifth reflectors 411, 412, 413, 414, and 415, only the first reflector 411 and the third reflector 413 are illustrated. FIG. 6 shows the first lens 110 in a top view. FIG. 7 shows the first lens 110 in a top and side view.

Referring to FIGS. 3, 4, 5, 6, 7, 8, 9, 10, and 11, the first lens 110 may include a first lens portion 111, a second lens portion 112 and an adhesive 113.

The first lens portion 111 may include a first curved surface CS1 having a concave curved surface with a first curvature, a first lower surface BSS1 having a rectangular shape, a first left surface LSS1 and a first right surface RSS1 having a trapezoidal shape, a first upper surface US1 sharing a first side of a curved line with the first curved surface CS1, and a lower surface BS1 sharing a second side of a curved line with the first curved surface CS1. The first curved surface CS1 may be a curved surface which is concave toward the lower side surface of the first lens portion 111.

The second lens portion 112 may include a second curved surface CS2 having a convex curved surface with a second curvature, a second upper surface USS2 having a rectangular shape, a second left surface LSS2 and a second right surface RSS2 having a trapezoidal shape, a second upper surface US2 sharing a first side of a curve line with the second curved surface CS2, and a lower surface BS2 sharing a second side of a curved line with the second curved surface CS2. The second curved surface CS2 may be a curved surface which is convex toward the first curved surface CS1 of the first lens portion 111.

The adhesive 113 is disposed between the first curved surface CS1 of the first lens portion 111 and the second curved surface CS2 of the second lens portion 112. The first curved surface CS1 of the first lens portion 111 and the second curved surface CS2 of the second lens portion 112 may be bonded to each other. The adhesive 113 may be an optically clear resin (OCR) or an optically clear adhesive (OCA).

The refractive index of the first lens portion 111 may be substantially equal to the refractive index of the second lens portion 112. In order to minimize an influence of the adhesive 113 causing refraction and reflection of the light of the first display device 210 provided to the first lens 110, it may be designed to match the refractive index of the adhesive 113 with the refractive index of the first lens portion 111 and the refractive index of the second lens portion 112. In this case, it is preferable that the refractive index of the adhesive 113 is substantially equal to the refractive index of the first lens portion 111 and the refractive index of the second lens portion 112. However, a difference between the refractive index of the adhesive 113 and the refractive index of the first lens portion 111 and a difference between the refractive index of the adhesive 113 and the refractive index of the second lens portion 112 may be less than or equal to 0.1.

The first to fifth reflectors 411, 412, 413, 414, and 415 may be disposed on the first curved surface CS1 of the first lens portion 111. The first to fifth reflectors 411, 412, 413, 414, and 415 may be formed by depositing metal such as silver (Ag) having high reflectivity on the first curved surface CS1 of the first lens portion 111. Since the first curved surface CS1 is formed as a concave curved surface with the first curvature, the reflecting surface of each of the first to fifth reflectors 411, 412, 413, 414, and 415 may be formed as a concave curved surface with a curvature.

Since the first to fifth reflectors 411, 412, 413, 414, and 415 are disposed on the first curved surface CS1 of the first lens portion 111, the curvature of the reflecting surface of the first reflector 411, the curvature of the reflecting surface of the second reflector 412, the curvature of the reflecting surface of the third reflector 413, the curvature of the reflecting surface of the fourth reflector 414, and the curvature of the reflecting surface of the fifth reflector 415 may be substantially the same. Further, since the first to fifth reflectors 411, 412, 413, 414, and 415 are thinly deposited on the first curved surface CS1 of the first lens portion 111, the curvature of the reflecting surface of the first reflector 411, the curvature of the reflecting surface of the second reflector 412, the curvature of the reflecting surface of the third reflector 413, the curvature of the reflecting surface of the fourth reflector 414, and the curvature of the reflecting surface of the fifth reflector 415 may be substantially the same as the first curvature of the first curved surface CS1.

As shown in FIG. 4, after a virtual image IM displayed by the first display device 210 is condensed by the first convex lens 310 and provided to the first to fifth reflectors 411, 412, 413, 414, and 415, it may be reflected by the first to fifth reflectors 411, 412, 413, 414, and 415 and emitted from an exit surface OS of the first lens 110 as an image B. The virtual image IM reflected by the first to fifth reflectors 411, 412, 413, 414, and 415 may be emitted from the exit surface OS of the first lens 110 and formed as one point on the retina of the user's right eye RE. Therefore, even if the user does not move the focus adjusted to object A corresponding to the real image, the user can view both the object A corresponding to the real image and the virtual image IM as an image B.

Since the reflecting surface of each of the first to fifth reflectors 411, 412, 413, 414, and 415 is formed as concave curved surface having a curvature, the image of the first display device 210 reflected by each of the first to fifth reflectors 411, 412, 413, 414, and 415 may have a predetermined focal length. The distance at which the image of the first display device 210 is viewed may be determined by the first convex lens 310 and each of the first to fifth reflectors 411, 412, 413, 414, and 415.

First, the distance at which the image of the first display device 210 is viewed, which is determined by the first convex lens 310, can be calculated by Eq. 1:

$$b1 = \frac{a1 \times f1}{a1 - f1} \qquad \text{Eq. 1}$$

where f1 is a focal length of the first convex lens 310, a1 is a distance between the first convex lens 310 and the first display device 210, and b1 is a distance at which the image of the first display device 210 is viewed by the first convex lens 310.

In this case, the distance at which the image of the first display device 210 is viewed, which is determined by the first reflector 411, can be calculated by Eq. 2:

$$b2 = \frac{a2 \times f2}{a2 - f2}, a2 = b1 + c1 \qquad \text{Eq. 2}$$

where f2 is a focal length of the first reflector 411, b1 is a distance at which the image of the first display device 210 is viewed by the first convex lens 310, c1 is a distance between the first convex lens 310 and the first reflector 411, and b2 is a distance at which the image of the first display device 210 is viewed by the first convex lens 310 and the first reflector 411.

When b2 is substantially equal to the optical distance from the first reflector 411 to the retina of the user's right eye RE, the image of the first display device 210 may be formed on the retina of the user's right eye RE by the first convex lens 310 and the first reflector 411. Therefore, as shown in FIG. 4, even if the user does not move the focus adjusted to the object A corresponding to the real image, the user can view both the object A corresponding to the real image and the virtual image IM.

Further, since b2 may be changed by the focal length f1 of the first convex lens 310 and the focal length f2 of the first reflector 411, by adjusting the focal length f1 of the first convex lens 310 and the focal length f2 of the first reflector 411, b2 can be adjusted to the optical distance from the first reflector 411 to the retina of the user's right eye RE.

The focal length f2 of the first reflector 411 may be determined according to the curvature of the reflecting surface of the first reflector 411, and the curvature of the reflecting surface of the first reflector 411 may be determined by the curvature of the first curved surface CS1. Therefore, the focal length f2 of the first reflector 411 can be adjusted by changing the curvature of the first curved surface CS1.

Since the distance at which the image of the first display device 210 is viewed by the first convex lens 310 and each of the second to fifth reflectors 412, 413, 414, and 415 is the same as the distance at which the image of the first display device 210 is viewed by the first convex lens 310 and the first reflector 411 described in conjunction with Eq. 1 and Eq. 2, a detailed description thereof will be omitted. Further, since the distance at which the image of the second display device 220 is viewed by the second convex lens 320 and each of the sixth to tenth reflectors 421, 422, 423, 424, and 425 is the same as the distance at which the image of the first display device 210 is viewed by the first convex lens 310 and the first reflector 411 described in conjunction with Eq. 1 and Eq. 2, a detailed description thereof will be omitted.

As shown in FIGS. 6, 7, and 10, the first reflector 411 and the second reflector 412 may be arranged in parallel in the width direction (X-axis direction) of the first lens 110. The first reflector 411 may be disposed closer to the left side surface, and the second reflector 412 may be disposed closer to the right side surface.

As shown in FIGS. 6, 7, and 11, the third reflector 413, the fourth reflector 414, and the fifth reflector 415 may be arranged in parallel in the width direction (X-axis direction) of the first lens 110. The fourth reflector 414 may be disposed between the third reflector 413, and the fourth reflector 414 in the width direction (X-axis direction) of the first lens 110. The third reflector 413 may be disposed closer to the left side surface, and the fifth reflector 415 may be disposed closer to the right side surface.

As shown in FIGS. 6, 7, 8, and 9, each of the first reflector 411 and the second reflector 412 may not be arranged in parallel with any one of the third reflector 413, the fourth reflector 414, and the fifth reflector 415 in the height direction (Y-axis direction) of the first lens 110. In this case, each of the first reflector 411 and the second reflector 412 may not overlap at all with any one of the third reflector 413, the fourth reflector 414, and the fifth reflector 415 in the height direction (Y-axis direction) of the first lens 110. Alternatively, each of the first reflector 411 and the second reflector 412 may partially overlap any one of the third reflector 413, the fourth reflector 414, and the fifth reflector 415 in the height direction (Y-axis direction) of the first lens 110.

A first spacer 510 for maintaining a distance between the first display device 210 and the first convex lens 310 may be disposed between the first display device 210 and the first convex lens 310. A second spacer 520 for maintaining a distance between the first convex lens 310 and the first lens 110 may be disposed between the first convex lens 310 and the first side surface of the first lens 110.

Meanwhile, the first display device 210, the second display device 220, the second convex lens 320 and the sixth to tenth reflectors 421, 422, 423, 424, and 425 may be implemented in substantially the same manner as the first lens 110, the first display device 210, the first convex lens 310 and the first to fifth reflectors 411, 412, 413, 414, and 415 described with reference to FIGS. 3, 4, 5, 6, 7, 8, 9, 10, and 11. Thus, a description of the first display device 210, the second display device 220, the second convex lens 320 and the sixth to tenth reflectors 421, 422, 423, 424, and 425 will be omitted.

According to the exemplary embodiment shown in FIGS. 3, 4, 5, 6, 7, 8, 9, 10, and 11, after an image of a display device is refracted through a convex lens, it is reflected by a reflector having a concave curved surface and provided to the user's eyes. Thus, the distance at which the image of the display device is viewed may be determined by the focal length of the convex lens and the focal length of the reflector. Therefore, even if the focal length of the convex lens is not reduced, the image of the display device can be provided to the user's eyes.

In addition, it is possible to prevent or reduce a decrease in image quality of a virtual image viewed by the user due to the chromatic aberration of the convex lens having a short focal length.

Figure 12:
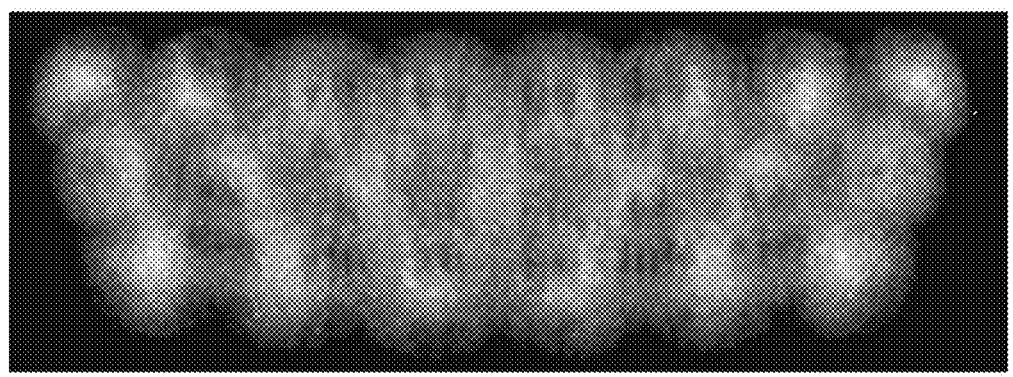
FIGS. 12, 13, and 14 show examples of a virtual image displayed on the first display device, which is displayed to the user according to the curvature of the first curved surface of the first lens.
Figure 13:
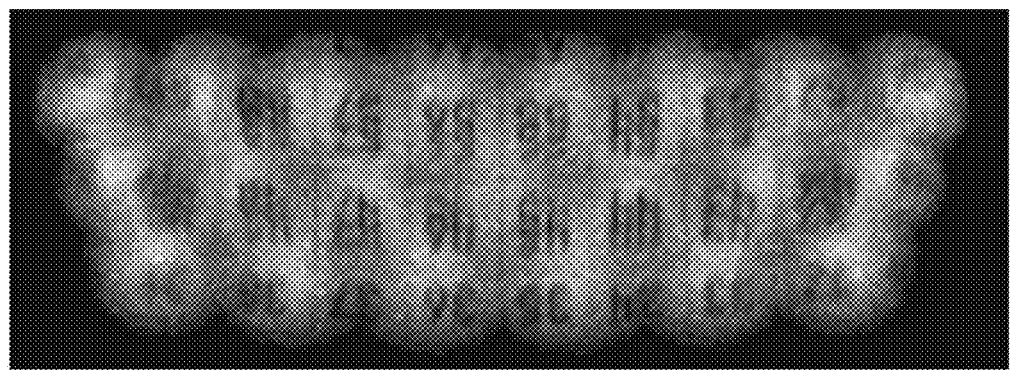
Figure 14:
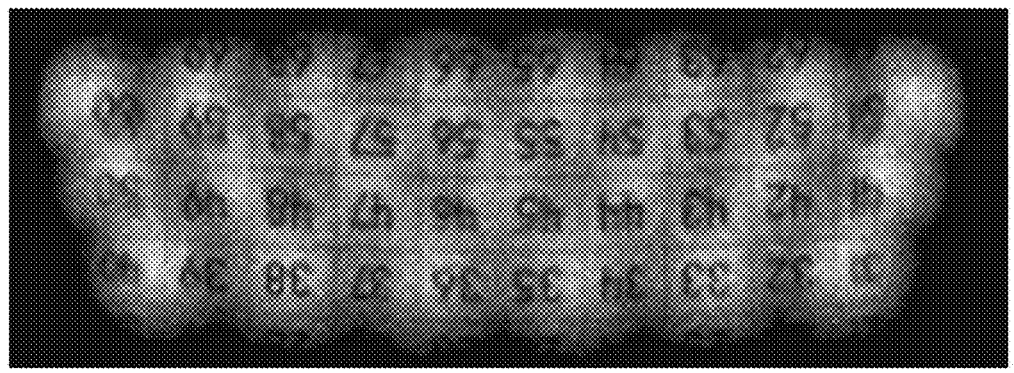

FIGS. 12, 13, and 14 show examples of a virtual image displayed on the first display device, which is displayed to the user according to the curvature of the first curved surface of the first lens.

FIG. 12 shows a virtual image of the first display device 210 displayed to the user when the curvature K of the first curved surface CS1 of the first lens 110 is 0.015 mm$^{-1}$. FIG. 13 shows a virtual image of the first display device 210 displayed to the user when the curvature K of the first curved surface CS1 of the first lens 110 is 0.01 mm$^{-1}$. FIG. 14 shows a virtual image of the first display device 210 displayed to the user when the curvature K of the first curved surface CS1 of the first lens 110 is 0.006 mm$^{-1}$.

In the examples of FIGS. 12, 13, and 14, twenty-one reflectors were disposed on the first curved surface CS1 of the first lens 110, and a virtual image of the first display device 210 was reflected by the twenty-one reflectors to provide virtual images to the user as shown in FIGS. 12, 13, and 14.

When the curvature K of the first curved surface CS1 is 0.015 mm$^{-1}$ as shown in FIG. 12, since the virtual image of the first display device 210 is not focused on the user's retina, the virtual image is blurred.

When the curvature K of the first curved surface CS1 is 0.01 mm$^{-1}$ as shown in FIG. 13, since the virtual image of the first display device 210 is focused near the user's retina, the user can view the virtual image of the first display device 210 to some extent.

When the curvature K of the first curved surface CS1 is 0.006 mm$^{-1}$ as shown in FIG. 14, since the virtual image of the first display device 210 is focused on the user's retina, the user can properly view the virtual image of the first display device 210.

Since the first to fifth reflectors 411, 412, 413, 414, and 415 are disposed on the first curved surface CS1 of the first lens 110, the curvature of the reflecting surface of each of the first to fifth reflectors 411, 412, 413, 414, and 415 depends on the curvature K of the first curved surface CS1 of the first lens 110. Further, the distance at which the virtual image of the first display device 210 is viewed may be determined by the first lens 110 and each of the first to fifth reflectors 411, 412, 413, 414, and 415. Therefore, the curvature K of the first curved surface CS1 of the first lens 110 according to the focal length of the first convex lens 310 can be optimally determined through a preliminary experiment.

Figure 15:
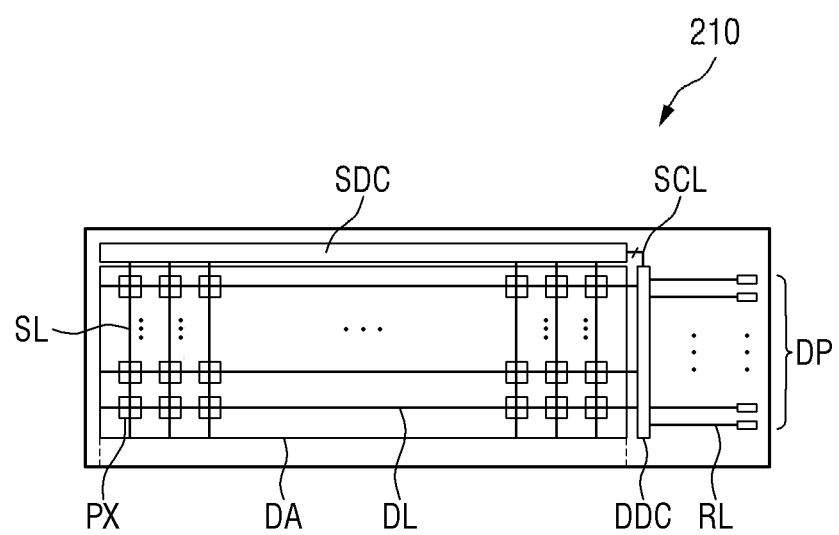
FIG. 15 is a plan view showing an example of the first display device of FIG. 3.

FIG. 15 is a plan view showing an example of the first display device of FIG. 3.

Referring to FIG. 15, the first display panel 211 of the first display device 210 may include a display area DA, a pad area PA, a scan driving circuit portion SDC and an integrated driving circuit portion DDC.

The display area DA may include data lines DL, scan lines SL and pixels PX. As shown in FIG. 15, the data lines DL may be arranged in the width direction (X-axis direction) of the first lens 110 and the scan lines SL may be arranged in the thickness direction (Z-axis direction) of the first lens 110. The pixels PX may be arranged in regions defined by the data lines DL and the scan lines SL. For example, the pixels PX may be arranged in the intersection regions of the data lines DL and the scan lines SL. A detailed description of the pixels PX of the display area DA will be given later with reference to FIG. 16.

The pad area PA includes routing lines RL connected to the integrated driving circuit portion DDC and pads DP connected to the routing lines RL. The pads DP may be electrically connected to the first circuit board 212. The first circuit board 212 may be attached onto the pads DP using an anisotropic conductive film.

The scan driving circuit portion SDC may be disposed on the first side of the display area DA. The scan driving circuit portion SDC may be disposed adjacent to the long side of the display area DA. The scan driving circuit portion SDC is connected to the scan lines SL of the display area DA. The scan driving circuit portion SDC may receive a scan control signal from the integrated driving circuit portion DDC, generate scan signals according to a scan control signal, and sequentially apply the scan signals to the scan lines SL.

The scan driving circuit portion SDC may include thin film transistors as switch elements. In this case, the thin film transistors of the scan driving circuit portion SDC may be formed simultaneously with the thin film transistors of the pixels PX of the display area DA.

The integrated driving circuit portion DDC may be disposed on the second side of the display area DA. The integrated driving circuit portion DDC may be disposed adjacent to the short side of the display area DA. The integrated driving circuit portion DDC may be disposed in the pad area PA. Alternatively, the integrated driving circuit portion DDC may be disposed on the first circuit board 212. The integrated driving circuit portion DDC may be formed of an integrated circuit.

The integrated driving circuit portion DDC receives the timing signals and the video data through the routing lines RL. The integrated driving circuit portion DDC may generate a scan control signal from the timing signals and output the scan control signal to the scan driving circuit portion SDC. The integrated driving circuit portion DDC may generate a data control signal from the timing signals. The integrated driving circuit portion DDC may generate and apply data voltages to the data lines DL during a period in which the scan signals are applied according to the data control signal and the video data.

FIG. 16 is a cross-sectional view specifically showing the display area of the first display panel of FIG. 14.

Referring to FIG. 16, the display area DA of the first display device 210 may include a substrate 1100, a thin film transistor layer 1230, a light emitting element layer 1240, and a thin film encapsulation layer 1300.

The thin film transistor layer 1230 is formed on the substrate 1100. The thin film transistor layer 1230 includes thin film transistors 1235, a gate insulating film 1236, an interlayer insulating film 1237, a protective film 1238, and a planarization film 1239.

A buffer film may be formed on the substrate 1100. The buffer film may be formed on the substrate 1100 to protect the thin film transistors 1235 and light emitting elements from moisture penetrating through the substrate 1100 susceptible to moisture permeation. The buffer film may include a plurality of alternately stacked inorganic films. For example, the buffer film may be formed of multiple films in which one or more inorganic films of a silicon oxide film (SiOx), a silicon nitride film (SiNx), and SiON are alternately stacked. The buffer film may be omitted.

The thin film transistors 1235 are formed on the buffer film. Each of the thin film transistors 1235 includes an active layer 1231, a gate electrode 1232, a source electrode 1233 and a drain electrode 1234. Although FIG. 3 illustrates that each of the thin film transistors 1235 is formed by a top gate method in which the gate electrode 1232 is formed above the active layer 1231, the present disclosure is not limited thereto. That is, each of the thin film transistors 1235 may be formed by a bottom gate method in which the gate electrode 1232 is located below the active layer 1231 or a double gate method in which the gate electrode 1232 is located both above and below the active layer 1231.

The active layer 1231 is formed on the buffer film. The active layer 1231 may be formed of a silicon-based semiconductor material or an oxide-based semiconductor material. A light shielding layer for shielding external light incident on the active layer 1231 may be formed between the buffer film and the active layer 1231.

The gate insulating film 1236 may be formed on the active layer 1231. The gate insulating film 1236 may be formed of an inorganic film, for example, a silicon oxide film (SiOx), a silicon nitride film (SiNx), or a multilayer film thereof.

The gate electrode 1232 and a gate line may be formed on the gate insulating film 1236. The gate electrode 1232 and the gate line may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

The interlayer insulating film 1237 may be formed on the gate electrode 1232 and the gate line. The interlayer insulating film 1237 may be formed of an inorganic film, for example, a silicon oxide film (SiOx), a silicon nitride film (SiNx), or a multilayer film thereof.

The source electrode 1233, the drain electrode 1234 and a data line may be formed on the interlayer insulating film 1237. Each of the source electrode 1233 and the drain electrode 1234 may be connected to the active layer 1231 via a contact hole passing through the gate insulating film 1236 and the interlayer insulating film 1237. The source electrode 1233, the drain electrode 1234 and the data line may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

The protective film 1238 for insulating the thin film transistor 1235 may be formed on the source electrode 1233, the drain electrode 1234 and the data line. The protective film 1238 may be formed of an inorganic film, for example, a silicon oxide film (SiOx), a silicon nitride film (SiNx), or a multilayer film thereof.

The planarization film 1239 may be formed on the protective film 1238 to flatten a step due to the thin film transistors 1235. The planarization film 1239 may be formed of an organic film such as an acryl resin, an epoxy resin, a phenolic resin, a polyamide resin, or a polyimide resin.

The light emitting element layer 1240 is formed on the thin film transistor layer 1230. The light emitting element layer 1240 includes light emitting elements and a pixel defining layer 1244.

The light emitting elements and the pixel defining layer 1244 are formed on the planarization film 1239. The light emitting element may be an organic light emitting device. In this case, the light emitting element may include an anode electrode 1241, light emitting layers 1242 and a cathode electrode 1243.

The anode electrode 1241 may be formed on the planarization film 1239. The anode electrode 1241 may be connected to the source electrode 1233 of the thin film transistor 1235 via the contact hole passing through the protective film 1238 and the planarization film 1239.

The pixel defining layer 1244 may be formed to cover the edge of the anode electrode 1241 on the planarization film 1239 to partition the pixels. That is, the pixel defining layer 1244 serves as a pixel defining layer for defining pixels. Each of the pixels represents a region where the anode electrode 1241, the light emitting layer 1242 and the cathode electrode 1243 are stacked sequentially and holes from the anode electrode 1241 and electrons from the cathode electrode 1243 are coupled to each other in the light emitting layer 1242 to emit light.

The light emitting layer 1242 is formed on the anode electrode 1241 and the pixel defining layer 1244. The light emitting layer 1242 may be an organic light emitting layer. The light emitting layer 1242 may emit one of red light, green light and blue light. The peak wavelength range of red light may be about 620 nm to 750 nm, and the peak wavelength range of green light may be about 495 nm to 570 nm. Further, the peak wavelength range of blue light may be about 450 nm to 495 nm. Alternatively, the light emitting layer 1242 may be a white light emitting layer that emits white light. In this case, the red light emitting layer, the green light emitting layer, and the blue light emitting layer may have a laminated form, and may be a common layer formed commonly to the pixels. In this case, the display device 200 may further include a separate color filter for displaying a red, green or blue color.

The light emitting layer 1242 may include a hole transporting layer, a light emitting layer, and an electron transporting layer. In addition, the light emitting layer 1242 may be formed in a tandem structure of two or more stacks, in which case a charge generating layer may be formed between the stacks.

The cathode electrode 1243 is formed on the light emitting layer 1242. The cathode electrode 1243 may be formed to cover the light emitting layer 1242. The cathode electrode 1243 may be a common layer formed commonly to the pixels.

In a case where the light emitting element layer 1240 is formed by a top emission method in which light is emitted upward, the anode electrode 1241 may be formed of a metal material having high reflectivity to have a laminated structure of aluminum and titanium (Ti/Al/Ti), a laminated structure of aluminum and ITO (ITO/AI/ITO), an APC alloy, and a laminated structure of an APC alloy and ITO (ITO/APC/ITO). The APC alloy is an alloy of silver (Ag), palladium (Pd) and copper (Cu). Further, the cathode electrode 1243 may be formed of a transparent conductive material (TCO) such as ITO or IZO that can transmit light or a semi-transmissive conductive material such as magnesium (Mg), silver (Ag), or an alloy of magnesium (Mg) and silver (Ag). When the cathode electrode 1243 is formed of a semi-transmissive conductive material, the light emission efficiency can be increased by microcavity.

In a case where the light emitting element layer 1240 is formed by a bottom emission method in which light is emitted downward, the anode electrode 1241 may be formed of a transparent conductive material (TCO) such as ITO or IZO or a semi-transmissive conductive material such as magnesium (Mg), silver (Ag), or an alloy of magnesium (Mg) and silver (Ag). The cathode electrode 1243 may be formed of a metal material having high reflectivity to have a laminated structure of aluminum and titanium (Ti/Al/Ti), a laminated structure of aluminum and ITO (ITO/Al/ITO), an APC alloy, and a laminated structure of an APC alloy and ITO (ITO/APC/ITO). When the anode electrode 1241 is formed of a semi-transmissive conductive material, the light emission efficiency can be increased by microcavity.

The thin film encapsulation layer 1300 is formed on the light emitting element layer 1240. The thin film encapsulation layer 1300 prevents or suppresses oxygen or moisture from permeating the light emitting layer 1242 and the cathode electrode 1243. To this end, the thin film encapsulation layer 1300 may comprise at least one inorganic film. The inorganic film may be formed of silicon nitride, aluminum nitride, zirconium nitride, titanium nitride, hafnium nitride, tantalum nitride, silicon oxide, aluminum oxide, or titanium oxide. Further, the thin film encapsulation layer 1300 may further include at least one organic film. The organic film may be formed to have a thickness sufficient to prevent or suppress particles from penetrating the thin film encapsulation layer 1300 and being injected into the light emitting layer 1242 and the cathode electrode 1243. The organic film may include any one of epoxy, acrylate or urethane acrylate. Instead of the thin film encapsulation layer 1300, an encapsulation substrate may be disposed on the light emitting element layer 1240.

According to the exemplary embodiments of the present disclosure, an image of a display device is refracted through a convex lens and reflected by a reflector having a concave curved surface to be provided to the user's eyes. Thus, the distance at which the image of the display device is viewed may be determined by the focal length of the convex lens and the focal length of the reflector. Therefore, without reducing the focal length of the convex lens, the image of the display device can be appropriately provided to the user's eyes. In addition, it is possible to prevent or reduce a decrease in image quality of a virtual image viewed by the user due to the chromatic aberration of the convex lens having a short focal length.

Although certain exemplary embodiments and implementations have been described herein, other exemplary embodiments and modifications will be apparent from this is description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical device comprising:
    a lens including a transparent or translucent material, the lens comprising:
        a first lens portion having a first curved surface with a first curvature; and
        a second lens portion having a second curved surface corresponding to the first curved surface, a side surface opposite to the second curved surface, and an upper surface sharing a first side of a curve line with the second curved surface;
    a display device disposed on a first side surface of the lens;
    a convex lens disposed between the first side surface of the lens and the display device; and
    a plurality of reflectors disposed on the first curved surface, the plurality of reflectors disposed between the first curved surface and the second curved surface, the plurality of reflectors configured to reflect light of the display device refracted by the convex lens into the upper surface of the second lens portion,
    wherein:
        an object disposed on other surface of the lens and an image of the display device is viewed from the one surface of the lens by reflecting the reflector which includes an opaque material;

the plurality of reflectors are disposed between the first lens portion and the second lens portion in one direction; and the display device is disposed on the second lens portion in the one direction.

2. The optical device of claim 1, wherein the lens comprises an adhesive disposed between the first lens portion and the second lens portion, the adhesive adhering the first curved surface of the first lens portion to the second curved surface of the second lens portion.

3. The optical device of claim 1, wherein the first curved surface of the first lens portion is concave away from the second lens portion, and wherein the second curved surface of the second lens portion is convex toward the first curved surface of the first lens portion.

4. The optical device of claim 1, wherein the first curvature is less than or equal to $0.01\ mm^{-1}$.

5. The optical device of claim 1, wherein each of the plurality of reflectors comprises a reflecting surface having a concave curved surface.

6. The optical device of claim 1, wherein a first lens surface of the convex lens facing the display device is convex toward the display device, and a second lens surface of the convex lens facing the lens is flat.

7. The optical device of claim 1, wherein a first lens surface of the convex lens facing the display device is flat, and a second lens surface of the convex lens facing the lens is convex.

8. The optical device of claim 1, wherein a first lens surface of the convex lens facing the display device is convex toward the display device, and a second lens surface of the convex lens facing the lens is convex toward the lens.

9. The optical device of claim 1, further comprising:
a first spacer disposed between the display device and the convex lens; and
a second spacer disposed between the convex lens and the lens.

10. An optical device comprising:
a lens comprising:
a first lens portion having a first curved surface with a first curvature; and
a second lens portion having a second curved surface corresponding to the first curved surface;
a display device disposed on a first side of the lens; and
a convex lens disposed between the first side surface of the lens and the display device; and
a first reflector and a second reflector disposed on the first curved surface of the lens, the first reflector and the second reflector configured to reflect light of a display device refracted by the convex lens into one surface of the lens, wherein:
the first reflector and the second reflector comprise reflecting surfaces having a concave curved surface; and
the first reflector or the second reflector overlaps the convex lens and the display device in one direction.

11. The optical device of claim 10, wherein a curvature of the reflecting surface of the first reflector is equal to a curvature of the reflecting surface of the second reflector.

12. The optical device of claim 10, wherein the first reflector and the second reflector are arranged in parallel in a width direction of the lens.

13. The optical device of claim 10, wherein the first reflector and the second reflector are not arranged in parallel in a height direction of the lens.

14. The optical device of claim 13, further comprising:
a first spacer disposed between the display device and the convex lens; and
a second spacer disposed between the convex lens and the lens.

15. The optical device of claim 10, wherein the first curved surface of the first lens portion is concave away from the second lens portion, and wherein the second curved surface of the second lens portion is convex toward the first curved surface of the first lens portion.

16. The optical device of claim 10, wherein the first curvature is less than or equal to $0.01\ mm^{-1}$.

17. An optical device comprising:
a lens comprising:
a first lens portion having a first curved surface with a first curvature; and
a second lens portion having a second curved surface corresponding to the first curved surface;
a display device disposed on a first side surface of the lens;
a convex lens disposed between the first side surface of the lens and the display device; and
a reflector disposed on the first curved surface of the first lens portion of the lens, the reflector configured to reflect light of the display device refracted by the convex lens toward a user's eye, wherein:
the first curvature is less than or equal to $0.01\ mm^{-1}$;
the reflector includes a first reflector and a second reflector arranged in parallel side-by-side in a width direction of the lens;
the first reflector and the second reflector are disposed between the first lens portion and the second lens portion in one direction; and
the display device is disposed on the second lens portion in one direction.

* * * * *